US 9,834,899 B2

(12) United States Patent
Monai

(10) Patent No.: US 9,834,899 B2
(45) Date of Patent: Dec. 5, 2017

(54) ARRANGEMENT ON FLOWING BODIES OF WATER

(71) Applicant: Bernhard Monai, Strassburg (AT)

(72) Inventor: Bernhard Monai, Strassburg (AT)

(*) Notice: Subject to any disclaimer, the term of this patent is extended or adjusted under 35 U.S.C. 154(b) by 0 days.

(21) Appl. No.: 14/786,356

(22) PCT Filed: Apr. 7, 2014

(86) PCT No.: PCT/AT2014/000073
§ 371 (c)(1),
(2) Date: Oct. 22, 2015

(87) PCT Pub. No.: WO2014/172721
PCT Pub. Date: Oct. 30, 2014

(65) Prior Publication Data
US 2016/0076212 A1    Mar. 17, 2016

(30) Foreign Application Priority Data

Apr. 25, 2013 (AT) .................................. A 348/2013

(51) Int. Cl.
*E02B 8/08* (2006.01)

(52) U.S. Cl.
CPC ..................... *E02B 8/085* (2013.01)

(58) Field of Classification Search
USPC .............................. 405/80–83; 119/203, 219
See application file for complete search history.

(56) References Cited

U.S. PATENT DOCUMENTS

| 1,522,772 | A | * | 1/1925 | Fearnow | E02B 8/085 |
|---|---|---|---|---|---|
| | | | | | 210/155 |
| 1,591,450 | A | * | 7/1926 | Wheeler | E02B 8/085 |
| | | | | | 405/82 |
| 1,680,722 | A | | 8/1928 | Bebbett et al. | |
| 2,119,540 | A | | 6/1938 | Holmes et al. | |
| 4,431,340 | A | * | 2/1984 | Truebe | E02B 8/085 |
| | | | | | 405/82 |
| 4,904,114 | A | | 2/1990 | Warner et al. | |

FOREIGN PATENT DOCUMENTS

GB        10827        12/1915

OTHER PUBLICATIONS

International Search Report; dated Jul. 25, 2014 for PCT Application No. PCT/AT2014/000073.

* cited by examiner

*Primary Examiner* — Sean D Andrish
(74) *Attorney, Agent, or Firm* — Mendelsohn Dunleavy, P.C.

(57) ABSTRACT

An arrangement on flowing bodies of water in the area of a transverse structure and/or water structure, in the form of a fish migration bypass (13) for transporting aquatic animals, in particular fish, between tail water (4) and head water (5), provided with a substantially vertical shaft (17). The water level in the shaft 17 is variable between the tail water and the head water level. A basket-like transport container (15), which can be moved in the shaft (17) and which is provided on the shaft for transport of aquatic animals, is equipped with floats (16), which are filled with air so that water rises/falls in the shaft (17) from the tail water (4) to the head water (5) and from the head water (5) to the tail water (4).

11 Claims, 4 Drawing Sheets

ARRANGEMENT ON FLOWING BODIES OF WATER

FIELD OF THE INVENTION

The invention relates to an arrangement on flowing bodies in the area of a transverse structure and/or a water structure, in particular a fish migration bypass which is used for transport of aquatic animals, in particular fish, between tail water and head water, having a substantially vertical shaft.

BACKGROUND OF THE INVENTION

Under transverse structures are understood natural or artificial structures introduced into water transversely to the water bed, which have an influence on the natural flow conditions and also on the bottom or bank structures in the body of water. Examples of transverse structures are ground sills, bottom sills, support sills, sill ramps, sill steps, sill slides, supports, weirs or dams.

Migration fish bypasses are fish aids facilitating fish migration in streaming bodies of water, which make it possible for fish and other animals living in water to overcome obstacles such as for example weirs, or natural obstacles such as river bottom steps. The large differences between the water levels located on the head water and tail water side make it impossible for the fish to overcome these obstacles, for example by springing. It is known that in order to gradually reduce the distance between the water levels upstream and downstream, fish migration bypasses can be provided with several basins having different water levels.

However, at many sites with hydroelectric plants, a very large number of basins is necessary in order to meet the actual requirements for the height of the falling water. Together with the typical requirements on the size of the basin (for example, the length of the basin=three times the length of the fish with the usual fish length of about 1 meter), very large fish migration passes are created. Their construction then becomes so expensive that even in areas where free construction is possible, the construction at existing weirs is so expensive that an investment in renewable energy through hydropower is often not worth it.

In addition, constructions in such large water construction sites can be realized only at a very significant expense. The subsoils are unknown and proximity to old buildings of unknown qualities of the construction materials encountered in the location result in cost-driving surprises that are often a rule rather than an exception.

In a number of locations, large migration bypasses for fish cannot be build also on the grounds of monument protection as they would interfere with aspects of the old buildings located around the body water.

An embodiment of a bypass for fish migration (also called a fish bypass), which does not require much space and which can overcome a large gradient, is a fish lift. With a fish lift, fish which are put into a tub that is equipped with a substantially vertical shaft are lifted with a pulling device from the tail water to the head water. The tub is then tilted into the head water so that the water located in the tube is passed along with the fish into the head water. A disadvantage of fish lifts is that their design is structurally complex and that they require a great deal of energy, especially since the entire weight of the tub filled with water in which the fish are collected must be lifted up. In addition, attracting the fish so that they would swim into the tail water in the tube, and in particular tipping the tub over into the area of the head water, is not very gentle with respect to the fish. An additional disadvantage is that the fish can swim into the fish lift only when the tube is arranged at the very bottom of the shaft.

SUMMARY OF THE INVENTION

The objective of the invention is to provide an arrangement of the type mentioned above that does not have the disadvantages of prior art.

In accordance with the invention, a means is provided for raising and lowering the water level in a shaft between the tail water and the head water. The walls of the shaft are rendered impermeable to water in the areas where the water level needs to be changed. This makes it unnecessary for the fish or other aquatic animals to have to leave their familiar environment when they are moved in a transport container from the stream of the current. The arrangement according to the invention is thus especially gentle on the aquatic animals. In addition, the arrangement according to the invention is particularly energy-efficient because it is no longer necessary to lift the fish in a transport container that is filled with water.

According to one possible embodiment of the invention, the arrangement is equipped with a transport container for aquatic animals in a shaft which is movable along the shaft, preferably in the form of a basket acting as a fish trap, which can be moved from tail water to head water and from head water to tail water through buoyancy in water. Since the transport container is moved up and away by buoyancy, this avoids having to pull the entire weight of a tub filled with water and fish with a pulling apparatus. Even if an additional pulling apparatus should be provided as a precaution, which can be avoided in accordance with the invention, thanks to buoyancy, only a small part of the weight of the transport container would need to be pulled.

In accordance with the invention, very little energy is required for the operation of the arrangement. In addition, the transporting of the fish can be achieved by changing the water level in the shaft, which is much more gentle on the fish than when the fish are lifted out in a closed tub from the body of water because the fish will remain at all times in water, which is to say in their natural environment. An additional advantage is that the container for transporting the fish can be designed with large dimensions, so that the fish have a sufficient space to avoid predatory fish that can be possibly present in the container.

In a preferred embodiment of the invention, the transport container is arranged in its lower position in which aquatic animals reach the transport container from tail water, wherein it is arranged in the tail water, in particular in the area at the bottom of the tail water; while in its upper position in the upper part of the shaft in which aquatic animals pass from the transport container to the head water, it is arranged in head water, in particular in the area at the head water level. The fish can thus be transported with the arrangement according to the invention not only from tail water to head water, but also from head water to tail water, so that the fish will remain at all time in water, which is to say in their natural environment.

Within the context of the invention it can be advantageous when the wall which is arranged in the tail water of the shaft is provided in the area of the tail water bottom with an outlet opening for water, or with an inlet opening for the aquatic animals in the shaft, as well as with a means for opening and closing this opening, in particular a slider. In addition, the wall of the shaft arranged in the head water is provided in the area of the water level of the head water with an outlet opening which enables the passage from the shaft and with a means for opening and closing the outlet opening, and in particular with a safeguard or a slider. A combination of the features of both of these embodiments then makes it possible to change the water level in the shaft with selective and targeted opening and/or closing of the inlet opening and/or outlet opening.

Within the context of the invention, the slider can be designed so that it can be activated electrically and/or manually. The opening and closing of the inlet opening and outlet opening can thus be controlled automatically, but also manually in a situation when manual opening is required.

Within the context of the invention it can be also provided that the wall of the shaft which is arranged in the head water is arranged directly on a wall of a weir, or formed by a wall of a weir. The result is that the space that is required with the weir arrangement is particularly small.

In a particularly preferred embodiment, a line can be provided which leads from the tail water into the inner part of the shaft, in particular into one of the regions of the tail water bottom that is associated with the bottom area of the shaft. It is preferred when the line leads into a lateral region of the wall of the shaft associated with the head water, so that the water coming out of the line and passing into the tail water forms a leading current (an attracting current or leading current).

It can be particularly advantageous in this case when the inlet opening is arranged in the water line in the flow direction of the head water in the shaft after the means for opening and closing the outlet opening. In this manner, the water can be conducted from the head water into the transport container which is located in its lower position and from which it passes through the open outlet opening for water. This also creates an inlet opening for aquatic animals, so that the current exits as a leading current into the tail water. Since the leading current is generated already in the shaft, it attracts the fish particularly effectively into the transporter container. An additional advantage with this type of generation of the leading current is that in spite of the fact that the leading current is created in the transport container, very little water turbulence will occur and the fish thus can remain in the transport container without any problem, in particular because calm areas are created in the area laterally adjacent to the opening of the water line. The leading current can be also used for rinsing of the buildup adhering to the transport container.

In order to create a leading current which stimulates the fish to swim from the transport container located in its upper position into the head water, it can be advantageous when an overflow channel is arranged on the wall of the shaft and/or in the walls arranged in the shaft in the area of the water level of the head water, so that the leading current enters via the outlet opening into the transport container and then flows out through the perforated side walls of the transport container through the overflow edges. This current leads the fish from the transport container into the head water so that the upward journey of the fish is thus completed.

It is advantageous when the transport container is connected with a buoyancy means, wherein the buoyancy means are floats, in particular inflatable floats. In accordance with this invention, inflatable floats can be controlled so that they can be filled with air by a compressor and so that the air can be discharged from the floats.

It is preferred when the bottom and the walls of the transport container are permeable to water, for example when they are formed with a grid-shaped design. This makes it possible to generate the leading current when the fish are swimming into the transport container, but also when they are swimming out of the container into the head water. In addition, this also makes it possible to create a lightweight construction.

In a particularly preferred embodiment of the invention, the transport container is provided with structures such as for example bristle elements, clay pipes, stones, deadwood parts, etc., so that smaller fish in particular can retreat when predatory fish are present in the container, or if the concentration of fish is too high in the transport container.

In particular, the transport container has no walls in locations that are associated with inlet and outlet openings to enable an unobstructed passage into the transport container and out of the transport container.

In the context of the invention it is also possible that in the area of the inlet into and/or outlet from the shaft is provided a device for generating a leading current, for example a pump and/or a water line, in order to increase the intensity of the leading current.

The arrangement according to the invention is provided with a means to raise and lower the water level in the shaft between the tail water and the head water level. The means for raising and lowering the water level in the shaft can be a means for opening and closing the inlet opening and/or the outlet opening for aquatic animals. As an alternative or in addition to that, at least one pump can be provided in conjunction with at least one water line, through which the shaft is connected with a water resource.

In the context of the invention, a device which functions as a fish trap can be arranged in the tail water in the area of the shaft, in particular adjacent to the shaft, preferably directly associated with the outlet opening for the water of with the inlet opening for aquatic animals.

In order to enable better access for maintenance purposes, the transport container may be connected to a device for moving the transport container along the shaft, in particular a compression device or a pulling device.

With the arrangement according to the invention, the water level in the shaft can be lowered also below the tail water level and/or raised above the head water level.

In an embodiment of the arrangement according to the invention, a transport container for aquatic animals can be provided which is movable in the shaft and along the shaft, in particular a basket which functions as a fish trap that can be moved from tail water to head water and from head water to tail water by buoyancy in water.

In another embodiment of the arrangement according to the invention, the transport container is arranged in its lower position in the shaft in which aquatic animals pass from tail water into the transport container, in the tail water, in particular in the area at the bottom of the tail water, and in its upper position it is arranged in the position above in the shaft, in which the aquatic animals pass from the water container into the head water, in head water, in particular in the area of the water level of the head water.

In yet another preferred embodiment of the arrangement according to the invention, the wall which is associated with the shaft and arranged in the tail water is provided in the area of the tail water with an outlet opening for water or with an inlet opening for aquatic animals in the shaft, as well as with a means for opening and closing this opening, in particular a slider.

In yet another embodiment of the arrangement according to the invention, the wall of the shaft which is associated with head water in the region of the water level of the head water is formed an outlet opening from the shaft, and provided with a means for opening and closing the outlet opening, in particular a slide.

In yet another embodiment of the arrangement according to the invention, the slider can be operated electrically and/or manually.

In another embodiment of the arrangement according to the invention, a water line is provided so that it starts from the headwater and leads into the interior of the shaft, in particular into the bottom area of the shaft associated with the bottom of the tail water, preferably in the lateral area of the wall of the shaft associated with the head water, which creates a leading current that leads into the tail water.

In a further embodiment of the arrangement according to the invention, the inlet opening into the water line is arranged seen in the current direction of the head water in the shaft after the means for opening and closing the outlet opening.

In another embodiment of the arrangement according to the invention, the walls arranged in the shaft and/or in the shaft in the area of the head water level are provided with an overflow channel.

In another embodiment of the arrangement according to the invention, the transport container can be connected with a buoyancy means, wherein the buoyancy means are floaters, in particular inflatable floaters.

In another embodiment according to the invention, the bottom and the walls of the transport container are permeable to water, for example so that they are formed with a grid design or perforated.

In another embodiment of the arrangement according to the invention, the transport container has no walls in locations associated with the outlet opening for water, or at the inlet opening and outlet opening for aquatic animals.

In another embodiment of the arrangement according to the invention, a leading current generating device, in particular a pump, is associated with the area of the outlet opening for water or inlet opening for aquatic animals and/or outlet openings of the shaft.

In another embodiment of the arrangement according to the invention, the means for raising and lowering the water level in the shaft, and the means for opening and closing the outlet opening for water or the inlet opening for aquatic animals and/or outlet opening are connected with at least one pump.

In another embodiment of the arrangement according to the invention, the water level in the shaft can be lowered below the tail water level and/or raised above the head water level.

In another embodiment of the arrangement according to the invention, a device functioning as a fish trap can be provided in tail water in the area of the shaft, in particular adjacent to the shaft, preferably directly associated with the outlet opening for aquatic animals.

In another embodiment of the arrangement according to the invention, the transport container can be provided with structures such as bristle elements, clay pipes, stones, deadwood parts, etc.

In another embodiment of the arrangement according to the invention, a holding chamber is provided in the area of tail water next to the shaft in which leading current is generated.

In another embodiment of the arrangement according to the invention, a fish trap is arranged in the area on the side opposite the holding chamber, which allows the fish to swim only in the direction toward the shaft.

In another embodiment of the arrangement according to the invention, a line is provided which leads from the head water into the holding chamber.

In another embodiment of the arrangement according to the invention, the line which leads from head water to the holding chamber is provided with a shutoff device, in particular a slider.

BRIEF DESCRIPTION OF THE DRAWINGS

Other details, characteristics and advantages of the invention will become evident from the description below with reference to the attached drawings which show preferred embodiments. The figures show the following.

DETAILED DESCRIPTION

Figure 1:
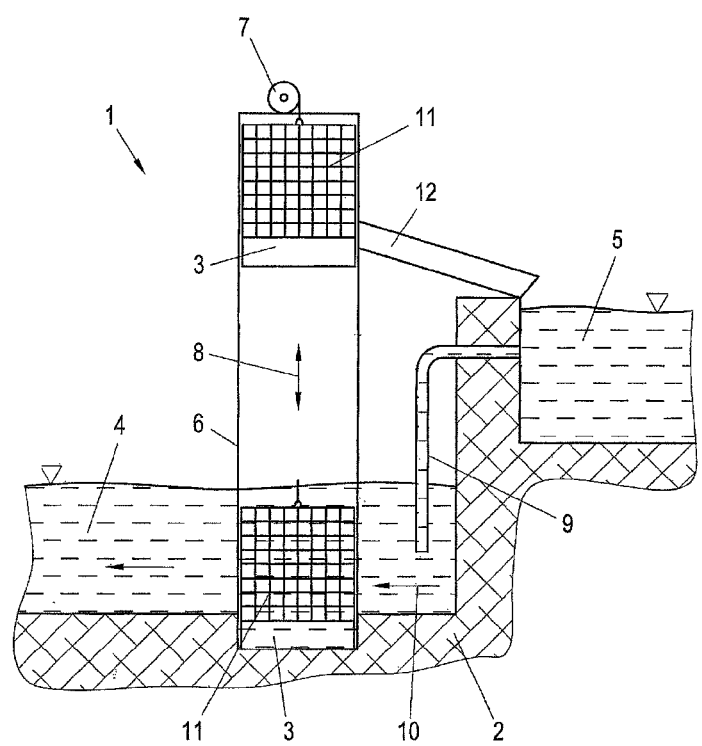
FIG. 1 a known fish lift.

FIG. 1 shows a fish lift 1 according to prior art arranged in the area of a weir 2, which is used to transport fish in a water-permeable tub 3 from tail water 4 into head water 5. The tub 3 is arranged in a vertical shaft 6, at first at the bottom of tail water 4, and it can be moved up and down as it is driven by pulling device 7 as indicated by the double arrow 8. A water line 9, which starts from the head water 5, leads to the tail water 4. The water which is conducted in this manner into the tail water 4 generates a leading current 10, by means of which the fish are oriented. The guiding current 18 generated outside of the shaft 6 permeates through the shaft 6 and attracts the fish into the interior of the shaft 6. This fish thus swim into a fish trap basket 11, which is arranged on the tub 3 and which prevents the fish from swimming out of the trap.

In addition, the tub 3 and the fish trap basket 11 are lifted by means of a pulling device 7 from the tail water 4 into a position above the tail water level. The tub 3 is then tilted so that the water located in the tube 3 containing the fish will flow via a channel 12 into the head water. After the tub 3 has been emptied, it is tilted back again and moved in the direction of the double arrow 8 in the downward direction into the tail water 4.

A disadvantage of the fish lift shown in FIG. 1 is that there is a risk that fish will remain lying on the fish trap basket 11 when the tub 3 is tilted and thus will not slide into the head water 5. This means that the fish will remain for a certain period of time out of water and in the air. Moreover, the fish cannot be transported with the known type of fish lift from the head water 5 to the tail water 4 because the fish cannot pass from the head water 5 into the tub 3. Also, the tub 3 must have a sufficient weight so that it could be submerged into the tail water 4 and then come to rest on the bottom of a body of water. Lightweight constructions of the tub 3 are therefore not possible and the entire weight thus must be pulled with the pulling device 7.

Figure 2:
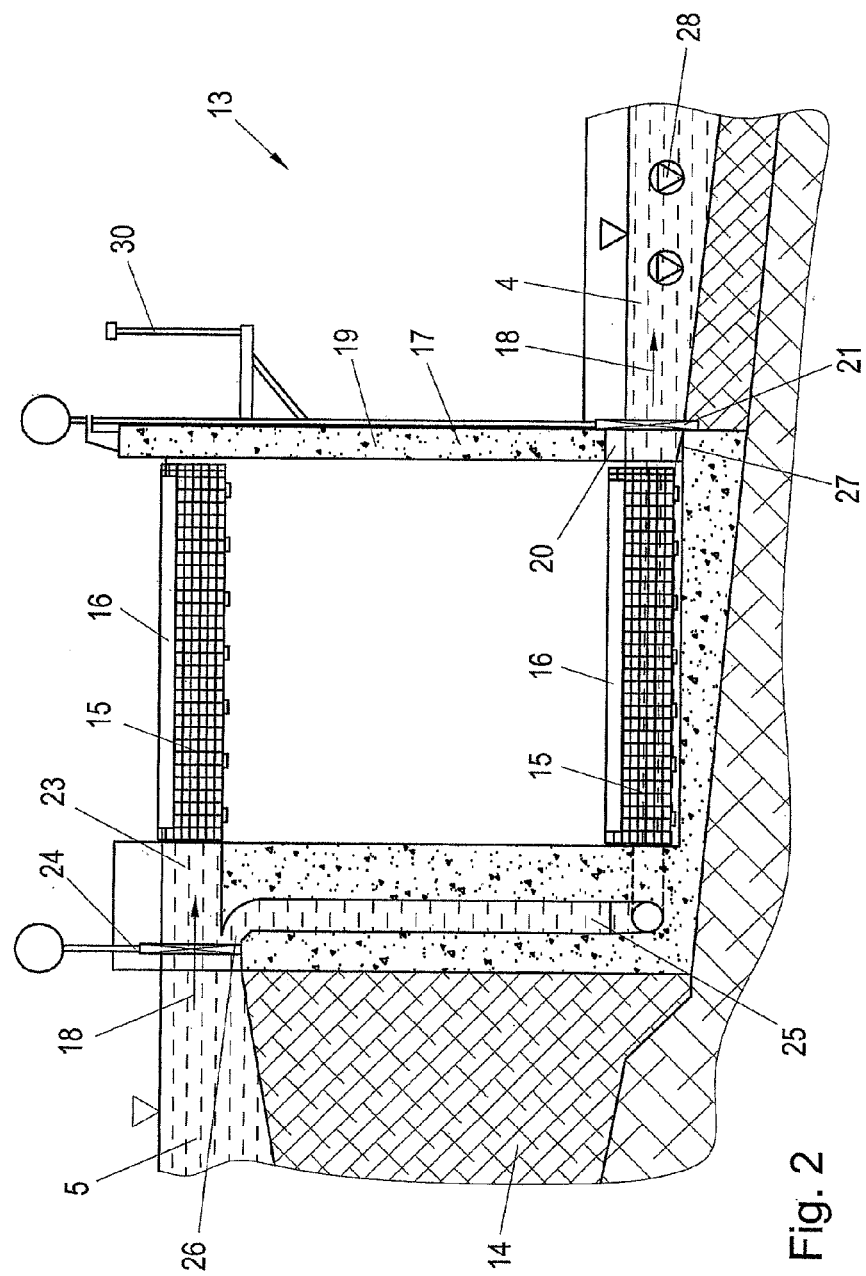
FIG. 2 an arrangement according to the invention in a cross-sectional view along the course of a body of water, FIG. 3 an arrangement according to the invention showing a section transverse to course of water, FIG. 4 another embodiment of the arrangement according to the invention in a cross-sectional view.
Figure 3:
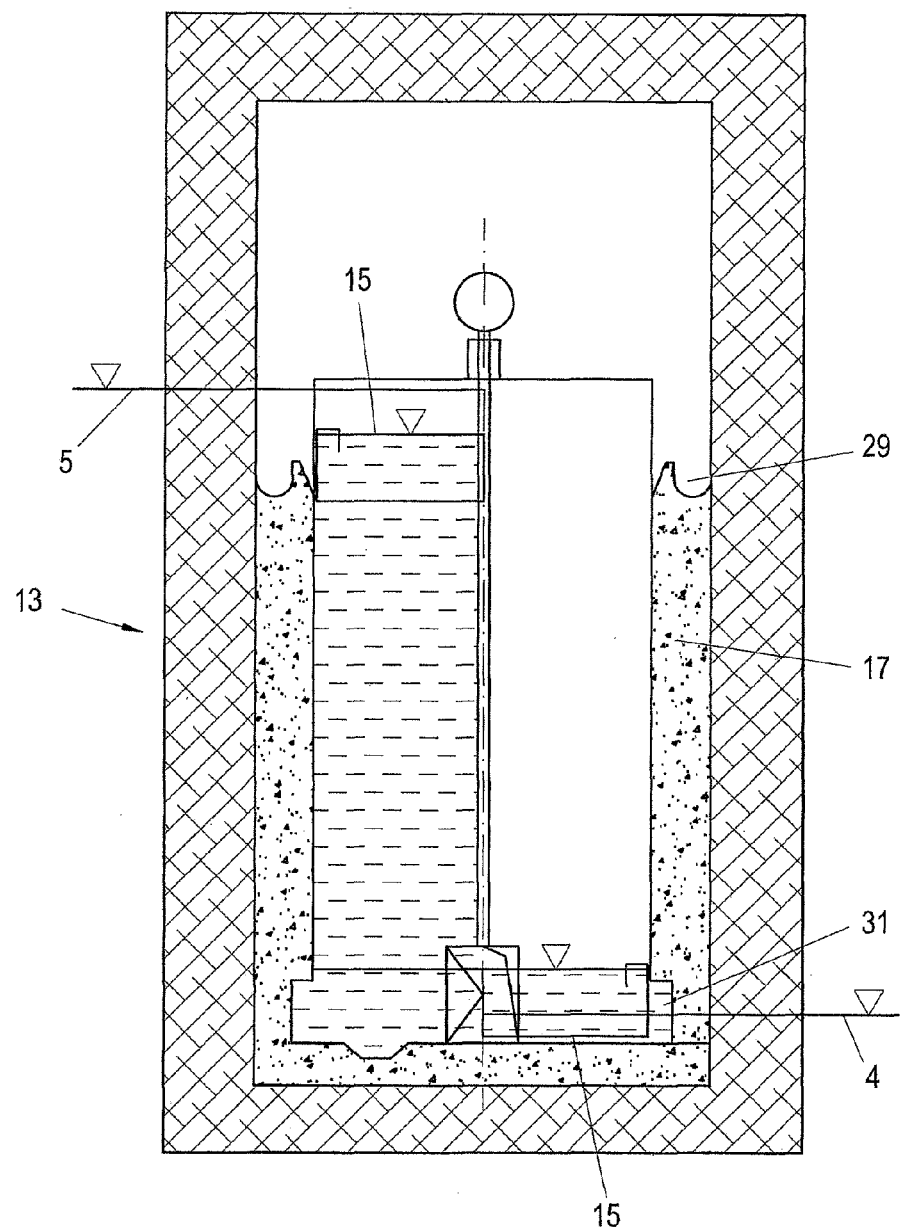

FIGS. 2 and 3 show a first embodiment of an arrangement according to the invention in the form of a fish migration pass or fish pass 13 deployed in the area of a weir 14, which makes it possible for the fish to be transported in a water-permeable transport container 15 from the tail water 4 into the head water 5. The transport container 15 is a basket, which is connected with float 16 and taken along with the fish in a vertical shaft 17 from the tail water 4 to the head water 5. The movement of the transport container occurs through buoyancy in water when the shaft 17 is filled with water and/or (partially) emptied. Leading currents 18 are generated both to attract the fish into the transport container 15 and also to induce them to swim out into the head water 5, wherein the fish swim against the direction of the leading current 18. FIG. 2 shows the transport container 15 for reasons of better comprehensibility both in the lower and in its upper position.

However, only one transport container 15 is provided in the embodiment example illustrated in FIG. 2 and FIG. 3.

The wall 19 of the shaft 17, which is associated with the tail water 4, is provided in the area of the tail water bottom with an inlet opening 20, as well as with a slider 21 which is used to open and close the inlet opening 20. The wall 22 of the shaft 17, which is associated with the head water 5, is provided in the area of the head water 5 with an outlet opening 23 from the shaft 17, and it is also equipped with a slider 24 for opening and closing the outlet opening 23. When the sliders 21, 24 are moved in the upward direction, the openings 20, 23 are open. When the sliders are moved in the downward direction, the openings 20, 23 are closed. A line 25 leads from the tail water 5 into the interior of the shaft 17. The inlet opening 26 of the water line 25 is arranged, seen in the direction of the leading current 18, after the slider 24 for opening and closing the outlet opening 23. The line opens into a lateral area of the wall 22 of the shaft 17 associated with head water 5 in which the bottom area is associated with the tail water bottom.

The operation of the fish migration pass 13 can be illustrated for example as follows:

In the initial capturing phase, the water level and the transport container 15 are located in the lower position in the shaft 17 in the area of the tail water 4 (as illustrated on the right side in FIG. 3). In this lower position of the transport container 15, the bottom of the transport container 15 is aligned with a small ramp 27 in the area of the bottom of the tail water. The air is released from the floats 16, the slider 21 is fully open in tail water and the slider 24 is partially open in head water. When the slider 24 is partially open in the area of head water 4, the water flows from the head water 5 partially into the water line 25 and partially into the shaft 17. Since the water entering the shaft 17 does not fill the shaft 17, the water flows from the inlet opening 20 into the tail water 4. The water from the water line 25 flows through the holes of the perforated metal sheets of the transport container 15, and also further through the shaft 17 and the inlet opening 20 for aquatic animals into the tail water 4. The leading current 18 is thus generated in this manner. The leading current 18 is also supported by the pumps 28 arranged in the tail water 4. The fish are attracted by the leading stream 18 so that they swim into the transport container 18. A basket can be provided as a fish trap to prevent the fish from swimming out of the transport container 15.

After the initial capturing period of about 20 minutes, the slider 21 in the tail water 4 is closed and the inlet opening 20 for the aquatic animals is thus also closed. The pumps 28 can be now turned off.

Since air is conducted into the floaters 16 through a compressor, the transport container 15 rises up together with the water level in the shaft 17. Water flows through the open outlet opening 23 and through other lines located in the shaft 17 into the shaft 17, so that the water level rises in the shaft 17 and the transport container 15 is also taken along upward in the area of head water 5, which is to say that it is rising.

When the slider 23 is already closed in the area of head water 5, the water fills the shaft 17 only through other lines.

FIG. 3 shows the left half of the transport container 15 in the upper position and the right half of the transport container 15 in the lower position. The side walls of the shaft 17 are provided at their upper end with overflow channels 29, which are arranged in the area of the outlet opening 23. When the slider 24 is already closed in the area of the head water 5, this opening is now open. This fish are thus induced to leave the transport container against the direction of the leading current 18. The transport container 15 and the fish are at this point already in the head water 5.

After the fish have left the transport container 15, the outlet opening 23 is closed by the slider 24 in the area of the head water 5. The inflow of water into the shaft 17 is thus inhibited. The slider 21 is opened in the tail 4 so that the water level in the shaft 17 is lowered and the transport container is moved along with the lower level downward. When the transport container 15 is located at the height of the tail water level, the air is let out from the floats 16 so that the transport container 15 is lowered regardless of the water level in the shaft 17 into its lower position. The slider 24 is again partially opened in head water 5 so that the water flows through the line 25 and generates a leading current 18 in the area of the tail water 4.

The transport container 15 may have a rectangular design, for example it may be provided with side lengths of approximately 2.00×3.00 m, or with a round design, for example having a diameter of approximately 2.5 m, so that greyling, which is the type of fish that determines the sizes with a length of 50 cm, can use the fish migration pass without a problem.

The transport container may be supported on rollers or wheels on the walls of the shaft 17 and it can be connected with a pulling device having hooks (not shown in the figures), in particular for maintenance purposes.

In order to control the content of the transport container 15, the slider 24 is closed in head water when the transport container 15 is located in its upper position. The transport container can be raised by the pulling device so that the fish can be captured with the fish nets. The transport container 15 can be lifted completely from the water for maintenance. The slider 21 is opened in tail water 4 so that the water level in the shaft 17 is lowered. As an alternative or in addition to this, the water can be also removed from the shaft 17 by other lines or pumps. The shaft 17 can then be cleaned.

In the upper area of the shaft 17 can provided an operation or observation platform 30.

In the lower area of the shaft 17 can be provided channels 31 on the inner side of the shaft 17 in order to provide support for the leading stream 18.

Although the operation of the arrangement according to the invention was described based on an embodiment provided with a transport container 15 and with reference to figures, the water level can be changed in the shaft 17 in the same or a similar manner also without the transport container 15 so that the fish can swim in the shaft 17 from the tail water 4 to the head water 5.

Regardless of whether a transport container 15 is provided or not, a holding tank equipped with a fish trap can be arranged at the inlet opening 20 in the tail water 4. The holding tank makes it possible for the fish to swim even when the slider 21 is closed in the tail water 4. When the slider 21 is closed in the tail water 4, the slider 24 is open in head water 5 and the shaft 17 is filled with water so that the fish can swim to the head water 5 in the shaft 17. When the slider 24 is closed in the head water 5 and the slider 21 is opened in the tail water 4, the water level is lowered in the shaft 17. The fish that at one point were limited to the tail water 4 by the slider 21 can thus also arrive to the fish migration pass 13 so that they will be collected in the holding tank, and when the slider 21 is again opened in the tail water 4, they can again swim into the shaft 17.

The holding tank can be associated with a device for generating a leading current 18, in particular a pump 28.

The arrangement according to the invention thus makes it possible for the fish to swim at any time in the arrangement.

Figure 4:
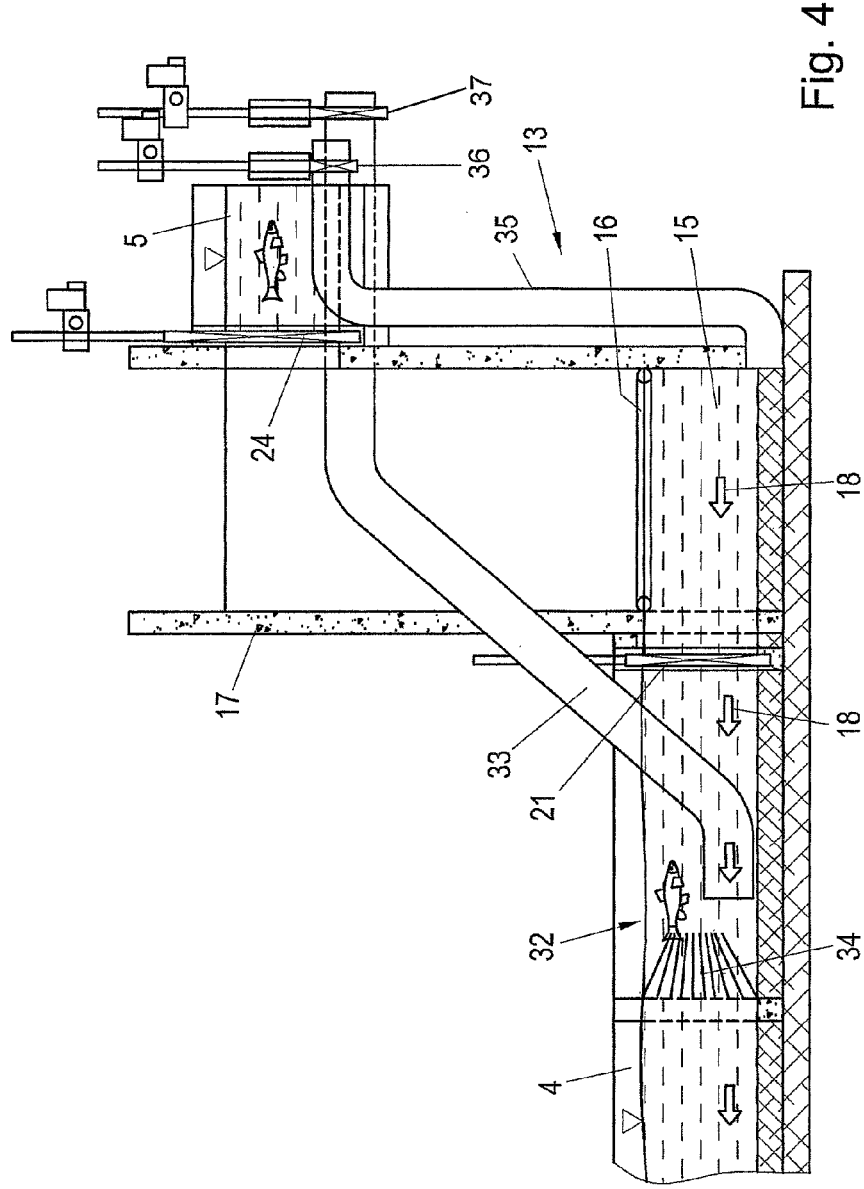

As shown in the embodiment which is indicated in FIG. 4, a fish migration pass 13 is again provided with a shaft 17 in which a basket is accommodated as a transport container 15 so that it can be moved up and down. The transport container 15 comprises floats 16 which cause lifting of the transport container 15 during the filling of the shaft 17.

In the position shown in FIG. 4, the transport container 15 is arranged at the lower end of the shaft 17. As a result of water flowing through a line 33 which leads from the head water 5 to a holding chamber 32 arranged in the area before the shaft 17 (creating a kind of "a waiting room"), a leading current 18 is generated in the holding chamber 32 and in the tail water so that the fish are induced to swim through a fish trap 34 into the holding chamber 32.

When a sufficient amount of fish is contained in the holding chamber 32, the slider 21, which is associated with an inlet opening 20 provided in the lower end of the shaft 17, is opened and the fish swim into the transport container 15.

When the slider 21 is closed at the lower end of the shaft 17, water is introduced into the shaft 17 through another line 35 from the head water 5, so that the transport container 15 is lifted by the effect of the buoyancy created by the floats 16 to the upper end of the shaft 17. As soon as it is reached, the slider 24 is opened at the upper end of the shaft 17 so that the transport container 15 is connected through that outlet opening 23 with the head water 5. The fish can then swim directly from the transport container 15 into the head water 5.

FIG. 4 also shows that in the area of the head water 5 are provided two additional sliders 36 and 37, wherein the slider 36 is used to supply water through the line 33 into the holding chamber 32 in order to generate the leading current 18. The other slider, slider 37, is used to regulate the supplying of water from the head water 5 through the line 15 into the lower area of the shaft 17.

An embodiment of the arrangement according to the invention can be also described for example as follows:

An arrangement on flowing bodies of water in the area of a transverse structure and/or water works, in the form of a fish migration pass 13 for transporting aquatic animals, in particular fish, between tail water 4 and head water 5, which is provided with a vertical shaft 17. The water level in the shaft 17 can be changed between the tail water level and the head water level. A basket-like transport container 15 for aquatic animals, which can be moved in and along the shaft 17, is provided with floats filled 16 with air which move the water level rising/falling in the shaft 17 from the tail water 4 to the head water 5, and from the head water 5 to the tail water 4.

The invention claimed is:

1. An arrangement for transporting aquatic animals between tail water and head water, characterized in that the arrangement comprises:
    a substantially vertical shaft having (i) a wall defining an interior, (ii) a shaft inlet opening, and (iii) a shaft outlet opening,
    means for opening and closing the shaft inlet opening, and means for opening and closing the shaft outlet opening, wherein:
        the means for opening and closing the shaft inlet and outlet openings are adapted to raise and lower a water level in the shaft between an area of the tail water and an area of the head water,
        in order to create a leading current that flows into the tail water in a downstream direction of flow of the tail water, a water line leads from the area of the head water into the interior of the shaft at a bottom area associated with a bed area at a bottom of the shaft,
        the water line leads into the interior of the shaft at a lateral region of the wall of the shaft below a water level of the tail water and in the downstream direction of the flow of the tail water such that water from the water line is injected into the shaft below the water level of the tail water and in the downstream direction of the flow of the tail water in order to create the leading current,
        a fish trap is provided next to the shaft in the area of the tail water in which is generated the leading current,
        a holding chamber is provided adjacent to the shaft,
        a line is provided which leads from the head water into the holding chamber, and
        the line is associated with a shutoff device.

2. The arrangement according to claim 1, characterized in that the arrangement is provided with a transport container for aquatic animals which is moveable in and along the shaft from the tail water to the head water and from the head water to the tail water through buoyancy in water.

3. The arrangement according to claim 2, characterized in that:
    when the transport container is in a lower position in the shaft, in which aquatic animals are able to pass from the tail water into the transport container, the transport container is arranged in the area of the tail water, and
    when the transport container is in an upper position in the shaft, in which aquatic animals are able to pass from the transport container into the head water, the transport container is arranged in the area of the head water.

4. The arrangement according to claim 2, characterized in that:
    the wall of the shaft is provided with the shaft inlet opening for water entering the shaft at the area of the head water and the shaft outlet opening for water leaving the shaft at the area of the tail water.

5. The arrangement according to claim 4, characterized in that the transport container has no walls arranged in locations associated with the shaft inlet opening and the shaft outlet opening.

6. The arrangement according to claim 4, characterized in that a leading current device is associated with a region for the shaft outlet opening at the area of the tail water.

7. The arrangement according to claim 2, characterized in that the transport container is connected to a device for moving the transport container along the shaft.

8. The arrangement according claim 2, characterized in that the transport container is connected to a buoyancy means.

9. The arrangement according to claim 2, characterized in that a bottom and walls of the transport container are designed so as to be permeable to water.

10. The arrangement according to claim 1, characterized in that the water level in the shaft is at least one of (i) lowerable below the water level of the tail water and (ii) raiseable above a water level of the head water.

11. The arrangement according to claim 1, wherein the arrangement is a fish migration pass for transporting fish.

\* \* \* \* \*